US011325199B2

(12) United States Patent
Matsuyama et al.

(10) Patent No.: US 11,325,199 B2
(45) Date of Patent: May 10, 2022

(54) CUTTING WORK METHOD AND METHOD FOR PRODUCING CUT PRODUCT

(71) Applicant: MITSUBISHI GAS CHEMICAL COMPANY, INC., Tokyo (JP)

(72) Inventors: Yousuke Matsuyama, Yonezawa (JP); Shigeru Horie, Tokyo (JP); Kazuhiro Nakamura, Yonezawa (JP); Kenji Ishikura, Yonezawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 789 days.

(21) Appl. No.: 15/998,976

(22) PCT Filed: Feb. 16, 2017

(86) PCT No.: PCT/JP2017/005724
§ 371 (c)(1),
(2) Date: Aug. 17, 2018

(87) PCT Pub. No.: WO2017/142023
PCT Pub. Date: Aug. 24, 2017

(65) Prior Publication Data
US 2021/0060673 A1  Mar. 4, 2021

(30) Foreign Application Priority Data

Feb. 17, 2016  (JP) .............................. JP2016-028249

(51) Int. Cl.
*B23D 59/02* (2006.01)
*B23C 3/28* (2006.01)
(Continued)

(52) U.S. Cl.
CPC ................ *B23D 59/02* (2013.01); *B23C 3/28* (2013.01); *B23C 5/28* (2013.01); *B23D 45/00* (2013.01);
(Continued)

(58) Field of Classification Search
CPC ...... B23D 59/02; B23D 45/00; C10M 107/34; C10M 103/02; C10M 169/044;
(Continued)

(56) References Cited

U.S. PATENT DOCUMENTS 2,392,481 A   1/1946 Kaplan et al.
3,220,893 A   11/1965 Blackwood et al.
(Continued)

FOREIGN PATENT DOCUMENTS

CN   102504909 A   6/2012
CN   104203512 A   12/2014
(Continued)

OTHER PUBLICATIONS

International Search Report for PCT/JP2017/005724 dated May 23, 2017; English translation submitted herewith (7 pages).
(Continued)

*Primary Examiner* — Vishal V Vasisth
(74) *Attorney, Agent, or Firm* — Fitch, Even, Tabin & Flannery LLP (57) ABSTRACT

The present invention provides a cutting work method comprising a cutting work step of forming a through-groove passing through from a surface to a back face of a workpiece material by cutting the workpiece material with a cutting tool while bringing a lubricant material for assisting cutting process into contact with the cutting tool and/or the to-be-processed portion of the workpiece material, wherein the workpiece material comprises one or more materials selected from the group consisting of a metal, a fiber reinforced plastic, ceramic, and a composite material thereof.

15 Claims, 2 Drawing Sheets

(51) Int. Cl.
| | |
|---|---|
| *B23C 5/28* | (2006.01) |
| *B23D 45/00* | (2006.01) |
| *C10M 103/02* | (2006.01) |
| *C10M 107/34* | (2006.01) |
| *C10N 40/20* | (2006.01) |
| *C10N 50/00* | (2006.01) |
| *C10N 20/00* | (2006.01) |
| *C10N 20/04* | (2006.01) |
| *C10N 20/06* | (2006.01) |
| *C10N 40/22* | (2006.01) |

(52) U.S. Cl.
CPC ........ *C10M 103/02* (2013.01); *C10M 107/34* (2013.01); *C10M 2201/0413* (2013.01); *C10M 2209/1033* (2013.01); *C10M 2209/1095* (2013.01); *C10N 2020/04* (2013.01); *C10N 2020/06* (2013.01); *C10N 2020/091* (2020.05); *C10N 2040/22* (2013.01); *C10N 2040/247* (2020.05); *C10N 2050/025* (2020.05)

(58) Field of Classification Search
CPC .. C10M 2217/0285; C10M 2209/1033; C10M 2209/043; C10M 2201/0413; C10M 2217/0453; C10M 2209/1095; C10M 2209/1085; C10M 2209/0845; C10M 2209/123; C10M 2201/041; C10M 2209/1023; C10M 2217/0443; B23C 3/28; B23C 5/28; B23C 3/00; C10N 2040/22; C10N 2050/025; C10N 2020/093; C10N 2020/06; C10N 2030/06; C10N 2020/091; C10N 2050/08; C10N 2040/247; C10N 2020/04; B23Q 11/1061; B28D 7/00; B28D 1/04; C09K 3/14
See application file for complete search history.

(56) References Cited

U.S. PATENT DOCUMENTS

| | | | |
|---|---|---|---|
| 4,052,323 A | 10/1977 | Feneberger et al. | |
| 4,519,732 A | 5/1985 | Sutcliffe | |
| 4,572,714 A | 2/1986 | Suzuki et al. | |
| 4,990,035 A | 2/1991 | Scheuch et al. | |
| 5,026,612 A * | 6/1991 | Selwood | F16B 11/006 29/469.5 |
| 5,082,402 A | 1/1992 | Gaku et al. | |
| 5,492,639 A | 2/1996 | Schneider et al. | |
| 5,507,603 A | 4/1996 | Nakano et al. | |
| 5,816,755 A | 10/1998 | Thelin | |
| 5,909,985 A | 6/1999 | Shiga et al. | |
| 6,164,876 A | 12/2000 | Cordovano | |
| 2002/0037400 A1 | 3/2002 | Fujiwara et al. | |
| 2002/0051684 A1 | 5/2002 | Eziri et al. | |
| 2002/0170178 A1 | 11/2002 | Zackrisson et al. | |
| 2003/0100456 A1 | 5/2003 | Hasaki et al. | |
| 2003/0152432 A1 | 8/2003 | Meece et al. | |
| 2004/0023059 A1 | 2/2004 | Kaburagi et al. | |
| 2004/0191016 A1 | 9/2004 | Hintze et al. | |
| 2005/0003169 A1 | 1/2005 | Ikeguchi et al. | |
| 2005/0123363 A1 | 6/2005 | Ahmkiel et al. | |
| 2007/0127997 A1 | 6/2007 | Muselli et al. | |
| 2008/0170917 A1 | 7/2008 | Hilker | |
| 2010/0028671 A1 | 2/2010 | Mitsui et al. | |
| 2010/0054871 A1 | 3/2010 | Prakash | |
| 2010/0172708 A1 | 7/2010 | Bolin et al. | |
| 2012/0020749 A1 | 1/2012 | Maeda et al. | |
| 2012/0039680 A1 | 2/2012 | Koike et al. | |
| 2012/0051863 A1 | 3/2012 | Craig et al. | |
| 2012/0219371 A1 | 8/2012 | Craig | |
| 2012/0282044 A1 | 11/2012 | Volokh et al. | |
| 2012/0294689 A1 | 11/2012 | Yagista | |
| 2012/0315547 A1 | 12/2012 | Itoh et al. | |
| 2013/0017025 A1 | 1/2013 | Azegami | |
| 2013/0020735 A1 | 1/2013 | Hintze et al. | |
| 2013/0170920 A1 | 7/2013 | Ogawa | |
| 2013/0209184 A1 | 8/2013 | Barry et al. | |
| 2013/0209190 A1 | 8/2013 | Oode et al. | |
| 2014/0260884 A1 | 9/2014 | Hsieh | |
| 2015/0072122 A1 | 3/2015 | Kamei et al. | |
| 2015/0111049 A1 | 4/2015 | Matsuyama et al. | |
| 2015/0125228 A1 | 5/2015 | Sugimoto et al. | |
| 2015/0298355 A1 * | 10/2015 | Ohlendorf | B28D 7/02 83/169 |
| 2016/0045961 A1 * | 2/2016 | Umehara | C08G 63/183 428/596 |
| 2017/0009171 A1 | 1/2017 | Soto-Castillo et al. | |
| 2017/0100781 A1 | 4/2017 | Zhang et al. | |
| 2017/0106606 A1 | 4/2017 | Toyozumi et al. | |
| 2017/0111997 A1 | 4/2017 | Matsuyama et al. | |
| 2017/0274461 A1 | 9/2017 | Mabuchi et al. | |
| 2018/0229339 A1 | 8/2018 | Matsuyama et al. | |

FOREIGN PATENT DOCUMENTS

| | | |
|---|---|---|
| CN | 104245256 A | 12/2014 |
| CN | 104321173 A | 1/2015 |
| CN | 105073355 A | 11/2015 |
| DE | 3531786 A1 | 3/1987 |
| EP | 0571352 A2 | 11/1993 |
| EP | 0608920 A1 | 8/1994 |
| EP | 0642297 A1 | 3/1995 |
| EP | 2979832 A1 | 2/2016 |
| EP | 3069709 A | 9/2016 |
| EP | 3333245 A1 | 6/2018 |
| EP | 3342517 A1 | 7/2018 |
| JP | S50-053768 A | 5/1975 |
| JP | S56-095991 A | 8/1981 |
| JP | 57-107718 A | 7/1982 |
| JP | S58-019716 B2 | 4/1983 |
| JP | H04-092494 A | 3/1993 |
| JP | H05-169400 A | 7/1993 |
| JP | H07-11210 U | 2/1995 |
| JP | H07-112311 A | 5/1995 |
| JP | H10-110183 A | 4/1998 |
| JP | 2000-015624 A | 1/2000 |
| JP | 2001-047307 A | 2/2001 |
| JP | 2001-098291 A | 4/2001 |
| JP | 2001-347602 A | 12/2001 |
| JP | 2002-301632 A | 10/2002 |
| JP | 2003-136485 A | 5/2003 |
| JP | 2003-225814 A | 8/2003 |
| JP | 2003-301187 A | 10/2003 |
| JP | 2004-230470 A | 8/2004 |
| JP | 2005-019657 A | 1/2005 |
| JP | 2003-175412 A | 6/2006 |
| JP | 2006-150557 A | 6/2006 |
| JP | 2006-181657 A | 7/2006 |
| JP | 2008-222762 A | 9/2008 |
| JP | 2008222762 A * | 9/2008 |
| JP | 2011-020248 A | 2/2011 |
| JP | 2011-183548 A | 9/2011 |
| JP | 2012-178550 A | 9/2012 |
| JP | 2012-210689 A | 11/2012 |
| JP | 2013-146819 A | 8/2013 |
| JP | 2014-019157 A | 2/2014 |
| JP | 2015-160275 A | 9/2015 |
| KR | 100270173 B1 | 11/2000 |
| KR | 100635108 B1 | 10/2006 |
| SG | 11201506893 U | 9/2015 |
| SG | 11201710736X | 1/2018 |
| TW | 201349966 A | 12/2013 |
| WO | 2012/091179 A1 | 7/2012 |
| WO | 2013/132837 A1 | 9/2013 |
| WO | 2013/141299 A1 | 9/2013 |
| WO | 2013/146612 A1 | 10/2013 |
| WO | 2014/157570 A1 | 10/2014 |

(56) References Cited

FOREIGN PATENT DOCUMENTS

WO    2015/152162 A1    10/2015
WO    2017/022822 A1    2/2017

OTHER PUBLICATIONS https://www.sigmaaldrich.com/catalog/product/aldrich/808113?lang=en&region=US (Year: 2018).

Zalucha et al., The Chemistry of Structural Adhesives: Epoxy, Urethane, and Acrylic Adhesives, 2007, p. 591 (Year 2007).

* cited by examiner

Fig.2

CUTTING WORK METHOD AND METHOD FOR PRODUCING CUT PRODUCT

CROSS-REFERENCE TO RELATED APPLICATIONS

This application is a U.S. national phase application filed under 35 U.S.C. § 371 of International Application PCT/JP2017/005724, filed Feb. 16, 2017, designating the United States, which claims priority from Japanese Application Number 2016-028249, filed Feb. 17, 2016.

FIELD OF THE INVENTION

The present invention relates to a cutting work method and a method for producing a cut product.

BACKGROUND OF THE INVENTION

High strength materials such as metals or alloys including stainless steel (SUS), fiber reinforced plastics (FRP), and ceramic are industrially essential materials. However, their cutting work for obtaining desired shapes is more difficult for higher strength thereof. In addition, tools for use in the processing are expensive and have a short lifespan. The most versatile high strength material includes stainless steel (SUS). Particularly, carbon fiber reinforced plastics (CFRP) have large tensile strength and tensile elastic force and small density, as compared with other fiber reinforced plastics such as glass fiber reinforced plastics (GFRP) and aramid fiber reinforced plastics (AFRP), or stainless steel (SUS), and have therefore tended to be frequently used as outer panels or the like of aircrafts or vehicles in recent years. The fiber reinforced plastics refers to plastics prepared by hot molding or hot press molding one or two or more layers of prepregs containing a fiber (e.g., carbon fiber or glass fiber) impregnated with a matrix resin. In the present specification, the high strength materials mentioned above and composite materials comprising these materials are referred to as "difficult-to-cut materials".

Some techniques for obtaining high quality holes, for example, by drilling work have already been proposed as cutting work methods for the difficult-to-cut materials mentioned above. Examples of such a technique include a method which involves gradually changing the shape of a tool, for example, the curvature of a cutting face or the point angle of a drill (see, for example, Patent Literature 1).

CITATION LIST

Patent Literature

Patent Literature 1: Japanese Patent Laid-Open No. 2012-210689

SUMMARY OF INVENTION

A tool such as a circular saw, a grind stone, a wire saw, or a router is used in a process to form through-grooves by the cutting work of metals or fiber reinforced plastics, including parting work. In the case of forming through-grooves in forms other than a linear form by the process to form through-grooves, a wire saw or a router is used. In the case of forming a linear through-groove, particularly, performing linear parting work, a circular saw or a grind stone is preferably used from the viewpoint of the finish of a cross section resulting from cutting work (hereinafter, also referred to as the "plane of section"), and processing efficiency. The cutting work of the difficult-to-cut materials as described above using a circular saw or the like causes considerable abrasion of the blade and reduces the quality of the plane of section. Specifically, the width of a processed through-groove is more likely to be narrowed, and burrs occur easily at the side end portion of the exit of the cutting tool, on the plane of section. Particularly, when the workpiece material is a fiber reinforced plastic, peeling between layers of prepregs (hereinafter, also referred to as "delamination") also occurs easily. Such a phenomenon is accepted as a serious defect. As mentioned above, the abrasion of the blade of the circular saw is likely to cause problems associated with the quality of the plane of section.

In the cutting work of difficult-to-cut materials, the problems associated with the quality of the plane of section arise more easily as the abrasion of a cutting tool proceeds with cutting resistance increased. Particularly, for example, high strength CFRP intended for aircrafts contains carbon fiber at a high density. Therefore, the frequency of rubbing of carbon fiber by a circular saw is increased so that the abrasion of the cutting tool proceeds more rapidly. As measures against this, the tool is changed at shorter intervals in order to maintain the quality of the plane of section. Under present circumstances, the ratio of tooling cost to processing cost is high.

In this respect, as described in Patent Literature 1, improvement in the workability of fiber reinforced plastics (e.g., CFRP), for which cutting work is difficult, has been studied in terms of tools, but has produced insufficient effects.

Particularly, conventional processing methods in difficult-to-cut material processing with a long cutting distance, such as through-groove formation, are more likely to cause the abrasion of a cutting tool with increase in cutting distance, as compared with difficult-to-cut material processing with a short cutting distance, such as drilling work. Unfortunately, this facilitates causing burrs or chippings at the entrance portion or the exit portion of cutting tool penetration (hereinafter, these portions are also collectively referred to as the "end portion of the plane of section"), and causing delamination, particularly, when the workpiece material is a fiber reinforced plastic. This is because a longer cutting distance increases the volume of a difficult-to-cut material to be removed by cutting work and increases load to a cutting tool.

For the difficult-to-cut material processing with a long cutting distance, there may further arise the problem of the heat of friction resulting from the processing. For example, fiber reinforced plastics containing a thermoplastic resin as a matrix resin (hereinafter, also referred to as "CFRTP") among CFRP have the advantages that CFRTP is easily processed by molding with a high degree of freedom, eliminates the need of curing under heat and pressure, and is inexpensive, as compared with fiber reinforced plastics containing a thermosetting resin as a matrix resin. On the other hand, a feature of CFRTP is that CFRTP tends to be inferior in mechanical strength, heat resistance, and chemical resistance. In the cutting work of CFRTP, melting of an impregnated resin caused by the heat of friction, and deterioration attributed to a cutting oil occur relatively easily. This is more likely to cause burrs or delamination on the plane of section. Therefore, it is more difficult to obtain a high quality plane of section.

The present invention has been made in light of the problems described above, and an object of the present invention is to provide a cutting work method for a difficult-to-cut material which can reduce load to a cutting tool in the cutting work of a workpiece material, particularly, the cutting work of a difficult-to-cut material to form a through-groove, and can reduce the occurrence of burrs, chippings, or delamination at the end portion of the plane of section, and a method for producing a cut product by use of the method.

The present inventors have conducted diligent studies to attain the object. As a result, the present inventors have completed the present invention by finding that the object can be attained by cutting a workpiece material with a cutting tool using a lubricant material for assisting cutting process.

Specifically, the present invention is as follows:

[1]

A cutting work method comprising a cutting work step of forming a through-groove passing through from a surface to a back face of a workpiece material by cutting the workpiece material with a cutting tool while bringing a lubricant material for assisting cutting process into contact with the cutting tool and/or a to-be-processed portion of the workpiece material, wherein the workpiece material comprises one or more materials selected from the group consisting of a metal, a fiber reinforced plastic, ceramic, and a composite material thereof.

[2]

The cutting work method according to [1], further comprising:

a close contact step of closely bringing in advance the lubricant material for assisting cutting process into contact with a portion to serve as a starting point for forming the through-groove, on the side face of the workpiece material.

[3]

The cutting work method according to [1] or [2], further comprising:

a close contact step of closely bringing in advance the lubricant material for assisting cutting process into contact with a portion where the through-groove is to be formed, on the surface and/or the back face of the workpiece material such that the lubricant material for assisting cutting process covers the portion.

[4]

The cutting work method according to any one of [1] to [3], wherein the cutting tool is a circular saw.

[5]

The cutting work method according to [4], further comprising:

a close contact step of closely bringing in advance the lubricant material for assisting cutting process into contact with a portion to serve as an exit of a blade of the rotating circular saw, on the surface or the back face of the workpiece material such that the lubricant material for assisting cutting process covers the portion.

[6]

The cutting work method according to any one of [1] to [5], wherein the lubricant material for assisting cutting process contains a high molecular weight compound (A) having a weight average molecular weight of $5\times10^4$ or higher and $1\times10^6$ or lower, a medium molecular weight compound (B) having a weight average molecular weight of $1\times10^3$ or higher and lower than $5\times10^4$, and a carbon (C) having an average particle size of 100 μm or larger.

[7]

The cutting work method according to [6], wherein a shape of the carbon (C) is a flake shape.

[8]

The cutting work method according to [6] or [7], wherein the high molecular weight compound (A) comprises a thermoplastic resin having a weight average molecular weight of $5\times10^4$ or higher and $1\times10^6$ or lower, and the medium molecular weight compound (B) comprises a thermoplastic resin having a weight average molecular weight of $1\times10^3$ or higher and $2\times10^4$ or lower.

[9]

The cutting work method according to any one of [6] to [8], wherein the high molecular weight compound (A) comprises a water soluble thermoplastic resin and/or a non-water soluble thermoplastic resin, wherein the water soluble thermoplastic resin is one or more resins selected from the group consisting of a polyalkylene oxide compound, a polyalkylene glycol compound, an ester compound of polyalkylene glycol, an ether compound of polyalkylene glycol, a monostearate compound of polyalkylene glycol, a water soluble urethane, a water soluble polyether resin, a water soluble polyester, sodium poly(meth)acrylate, polyacrylamide, polyvinylpyrrolidone, polyvinyl alcohol, saccharides, and modified polyamide, and the non-water soluble thermoplastic resin is one or more resins selected from the group consisting of a urethane-based polymer, an acrylic-based polymer, a vinyl acetate-based polymer, a vinyl chloride-based polymer, a polyester-based polymer, a polystyrene-based resin, and a copolymer thereof.

[10]

The cutting work method according to any one of [6] to [9], wherein the medium molecular weight compound (B) is one or more compounds selected from the group consisting of a polyalkylene glycol compound, a monoether compound of polyalkylene oxide, a monostearate compound of polyalkylene oxide, and a polyalkylene oxide compound.

[11]

The cutting work method according to any one of [6] to [10], wherein in the lubricant material for assisting cutting process, a content of the high molecular weight compound (A) is 20 to 60 parts by mass based on 100 parts by mass in total of the high molecular weight compound (A), the medium molecular weight compound (B), and the carbon (C), a content of the medium molecular weight compound (B) is 10 to 75 parts by mass based on 100 parts by mass in total of the high molecular weight compound (A), the medium molecular weight compound (B), and the carbon (C), and a content of the carbon (C) is 5 to 70 parts by mass based on 100 parts by mass in total of the high molecular weight compound (A), the medium molecular weight compound (B), and the carbon (C).

[12]

The cutting work method according to any one of [1] to [11], wherein the lubricant material for assisting cutting process is a lubricant sheet for assisting cutting process, having a thickness of 0.1 mm or larger and 20 mm or smaller.

[13]

The cutting work method according to any one of [1] to [12], wherein the lubricant material for assisting cutting process has an adhesive layer on a face to be brought into contact with the workpiece material.

[14]
The cutting work method according to [13], wherein
the adhesive layer comprises an acrylic-based polymer.
[15]
The cutting work method according to any one of [1] to [14], wherein
the workpiece material is one or more materials selected from the group consisting of stainless steel, a carbon fiber reinforced plastic, and a composite material comprising these materials.
[16]
The cutting work method according to any one of [1] to [15], wherein
the workpiece material is a carbon fiber reinforced plastic containing a thermoplastic resin as a matrix resin.
[17]
A method for producing a cut product, comprising a cutting work method according to any one of [1] to [16].

The present invention can provide a cutting work method for a difficult-to-cut material which can reduce load to a cutting tool in the cutting work of a workpiece material, particularly, the cutting work of a difficult-to-cut material to form a through-groove, can reduce the occurrence of burrs or chippings at the end portion of the plane of section, and can reduce delamination when the workpiece material is a fiber reinforced plastic, and a method for producing a cut product by use of the method.

DESCRIPTION OF EMBODIMENTS

Hereinafter, the mode for carrying out the present invention (hereinafter, referred to as the "present embodiment") will be described in detail. However, the present invention is not intended to be limited by the present embodiment, and various changes or modifications can be made without departing from the spirit of the present invention.

Cutting Work Method

The cutting work method of the present embodiment comprises a cutting work step of forming a through-groove passing through from a the surface to a back face of a workpiece material by cutting the workpiece material with a cutting tool while bringing a lubricant material for assisting cutting process into contact with the cutting tool and/or a to-be-processed portion of the workpiece material, wherein the workpiece material comprises one or more materials selected from the group consisting of a metal, a fiber reinforced plastic, ceramic, and a composite material thereof.

The lubricant material for assisting cutting process is used in the cutting work of a workpiece material, particularly, a difficult-to-cut material. Specifically, the lubricant material for assisting cutting process is placed on a portion to serve as an exit and/or a portion to serve as an entrance of the cutting tool, in the workpiece material, and the workpiece material is processed using the cutting tool. The cutting work method of the present embodiment is not particularly limited as long as the cutting work step is performed while the lubricant material for assisting cutting process is brought into contact with the cutting tool and/or the to-be-processed portion of the workpiece material. The cutting work step may be performed, for example, using the cutting tool brought in advance into contact with the lubricant material for assisting cutting process. Specific examples of the phrase "while bringing into contact with" include, but are not particularly limited to: the case where after a contact step of bringing the lubricant material for assisting cutting process into contact with the cutting tool before cutting work so that the lubricant material for assisting cutting process is attached thereto, the cutting work step is carried out by cutting the to-be-processed portion of the workpiece material with the lubricant material for assisting cutting process-attached cutting tool; the case where after a close contact step of closely bringing the lubricant material for assisting cutting process into contact with the to-be-processed portion (e.g., a portion to serve as an exit and/or a portion to serve as an entrance of the blade of a circular saw) of the workpiece material such that the lubricant material for assisting cutting process covers the to-be-processed portion, the to-be-processed portion of the workpiece material is cut; the case where in the cutting work step, the lubricant material for assisting cutting process is brought into contact with the cutting tool, and the workpiece material is cut in the lubricant material for assisting cutting process-attached state; and combined use of two or more of these cases.

In the cutting work method of the present embodiment, a circular saw is preferably used as the cutting tool. The cutting work to form a through-groove using a circular saw as the cutting tool is more likely to cause the abrasion of the cutting tool due to a long cutting distance, as compared with drilling work with a drill bit or the like, and burrs, chippings, or delamination occurs easily at the entrance portion or the exit portion of cutting tool penetration. This is because the cutting tool is moved in contact with the workpiece material, and this increases the volume of a difficult-to-cut material to be removed by the cutting work and increases load to the cutting tool.

In this respect, use of the lubricant material for assisting cutting process in the cutting work of a difficult-to-cut material to form a through-groove can reduce load to a cutting tool (e.g., a circular saw), suppress the abrasion of the cutting tool, and prolong the lifespan of the cutting tool, by the action of the lubricant material for assisting cutting process as a lubricant agent. As a result, cost required for cutting tools, the number of runs of a cutting tool change step, or the like can be reduced. Thus, cutting work excellent in productivity is achieved.

Furthermore, use of the lubricant material for assisting cutting process in the cutting work of a difficult-to-cut material to form a through-groove can suppress burrs, chippings, or delamination at the entrance portion or the exit portion of cutting tool penetration by the action of the lubricant material for assisting cutting process as a lubricant agent. As a result, a high quality plane of section can be obtained, as compared with the case of not using the lubricant material for assisting cutting process.

Moreover, the lubricant material for assisting cutting process can be preferably used not only when the to-be-processed portion of the workpiece material has a flat surface but when the to-be-processed portion has a curved surface, as with the flat surface. Specifically, the lubricant material for assisting cutting process is excellent in flexibility and to-be-processed portion following properties, and permits cutting work in close contact with a workpiece material having a curved surface. The lubricant material for assisting cutting process preferably has a configuration that impairs neither the flexibility of the lubricant material for assisting cutting process itself nor its to-be-processed portion following properties, and specifically, is preferably in a form free from thick metal foil or the like, though the configuration is not particularly limited thereto. This further improves the cutting workability of the workpiece material having a curved surface. Also, the lubricant material for assisting cutting process free from metal foil can prevent the cut portion of the workpiece material from being contaminated by the adhesion of metal foil-derived metal scraps to the cut portion of the workpiece material. As a result, the cutting work of the present embodiment can be superior in quality to the cutting work of conventional techniques.

Contact Step

The cutting work method of the present embodiment is not particularly limited as long as the method comprises a cutting work step of cutting a workpiece material with a cutting tool while bringing a lubricant material for assisting cutting process into contact with the cutting tool and/or the to-be-processed portion of the workpiece material. The cutting work method of the present embodiment may optionally comprise a contact step. The contact step is the step of bringing the lubricant material for assisting cutting process into contact with the cutting tool before the cutting work step. The lubricant material for assisting cutting process is brought in advance into contact with the cutting tool to thereby transfer a lubricating component of the lubricant material for assisting cutting process to the tip of the cutting tool immediately before processing. Therefore, the lubricating effect of the lubricant material for assisting cutting process is exerted more effectively. The contact method is not particularly limited. For example, the lubricant material for assisting cutting process is placed on the entrance face side (entry face side) of the cutting tool so that the lubricant material for assisting cutting process can be attached to the cutting tool before the cutting work. Alternatively, the lubricant material for assisting cutting process is applied in advance to the cutting tool so that the lubricant material for assisting cutting process can be attached to the cutting tool. Furthermore, the lubricant material for assisting cutting process is cut off, cut, or drilled with the cutting tool before the cutting work so that the lubricant material for assisting cutting process can be attached to the cutting tool.

Close Contact Step

The cutting work method of the present embodiment may optionally comprise a close contact step of closely bringing in advance the lubricant material for assisting cutting process into contact with a portion to serve as the exit of the cutting tool and/or a portion to serve as the entrance of the cutting tool, in the workpiece material before the cutting work step. The close contact site on the workpiece material with the lubricant material for assisting cutting process may be either of the portion to serve as the exit of the cutting tool or the portion to serve as the entrance of the cutting tool, or may be both of the portion to serve as the exit of the cutting tool and the portion to serve as the entrance of the cutting tool, in advance. Among others, an embodiment is more preferred in which the lubricant material for assisting cutting process is closely brought into contact with a portion to serve as the exit of the cutting tool. When the cutting tool is a circular saw, examples of such an embodiment include an embodiment having a close contact step of closely bringing in advance the lubricant material for assisting cutting process into contact with a portion to serve as the exit of the blade of the rotating circular saw, on the surface or the back face of the to-be-processed portion such that the lubricant material for assisting cutting process covers the portion. The reason why the embodiment is more preferred in which the lubricant material for assisting cutting process is closely brought into contact with a portion to serve as the exit of the cutting tool is that the portion to serve as the exit of the cutting tool, at the end portion of the plane of section suffers more considerable deformation during cutting work, and therefore, it can be expected that the deformation is suppressed by placing the lubricant material for assisting cutting process at the portion to serve as the exit of the cutting tool. This can reduce load to the cutting tool, as mentioned above, and can reduce the occurrence of burrs, chippings, or delamination at the end portion of the plane of section. The "portion to serve as an exit" can be used interchangeably with a face to serve as an exit if this portion is a face. In response to this, the "portion to serve as an entrance" can be used interchangeably with a face to serve as an entrance.

The portion to be closely brought in advance the lubricant material for assisting cutting process into contact with may be a portion to serve as a starting point for forming the through-groove, on the side face of the workpiece material, or may be a portion where the through-groove is to be formed, on the surface and/or the back face of the workpiece material. This is because the close contact of the lubricant material for assisting cutting process in advance with a portion to serve as a starting point for forming the through-groove or a portion where the through-groove is to be formed such that the lubricant material for assisting cutting process covers the portion can reduce load to the cutting tool, as mentioned above, and can reduce the occurrence of burrs, chippings, or delamination at the end portion of the plane of section. Particularly, it is preferred to closely bring in advance the lubricant material for assisting cutting process into contact with the whole face of a portion where the through-groove is to be formed, because this can further reduce the occurrence of burrs, chippings, or delamination at the end portion of the plane of section.

Figure 1:
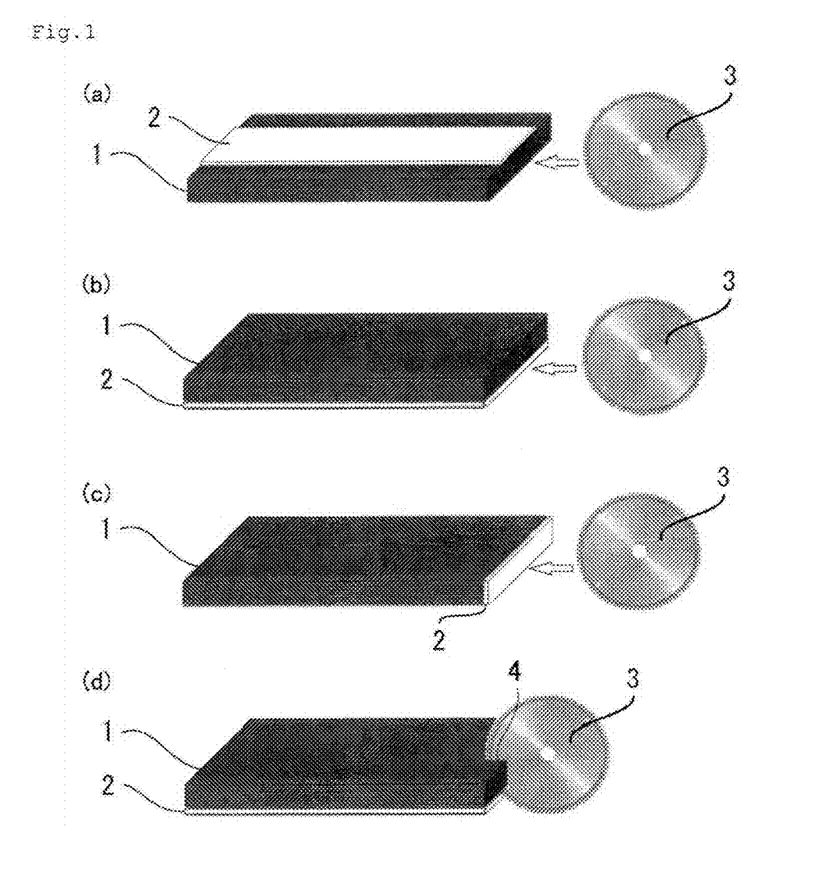
FIG. 1 shows a schematic diagram illustrating an embodiment in which a lubricant material for assisting cutting process is closely brought into contact with a workpiece material in the cutting work method of the present embodiment.

FIG. 1 shows a schematic diagram illustrating an embodiment in which the lubricant material for assisting cutting process is closely brought into contact with the workpiece material in the cutting work method of the present embodiment. FIG. 1(a) shows an embodiment in which a lubricant material for assisting cutting process 2 is closely brought in advance into contact with a portion where the through-groove is to be formed, on the surface of a workpiece material 1. FIG. 1(b) shows an embodiment in which the lubricant material for assisting cutting process 2 is closely brought in advance into contact with the whole back face of the workpiece material 1. FIG. 1(c) shows an embodiment in which the lubricant material for assisting cutting process 2 is closely brought in advance into contact with a portion to serve as a starting point for the cutting work (a site where the blade of the cutting tool enters) for the through-groove, on the side face of the workpiece material 1. FIG. 1(d) shows a diagram showing an embodiment under cutting work in FIG. 1(b). In FIG. 1(d), burrs, chippings, or delamination at an end portion 4 of the plane of section is suppressed.

Figure 2:
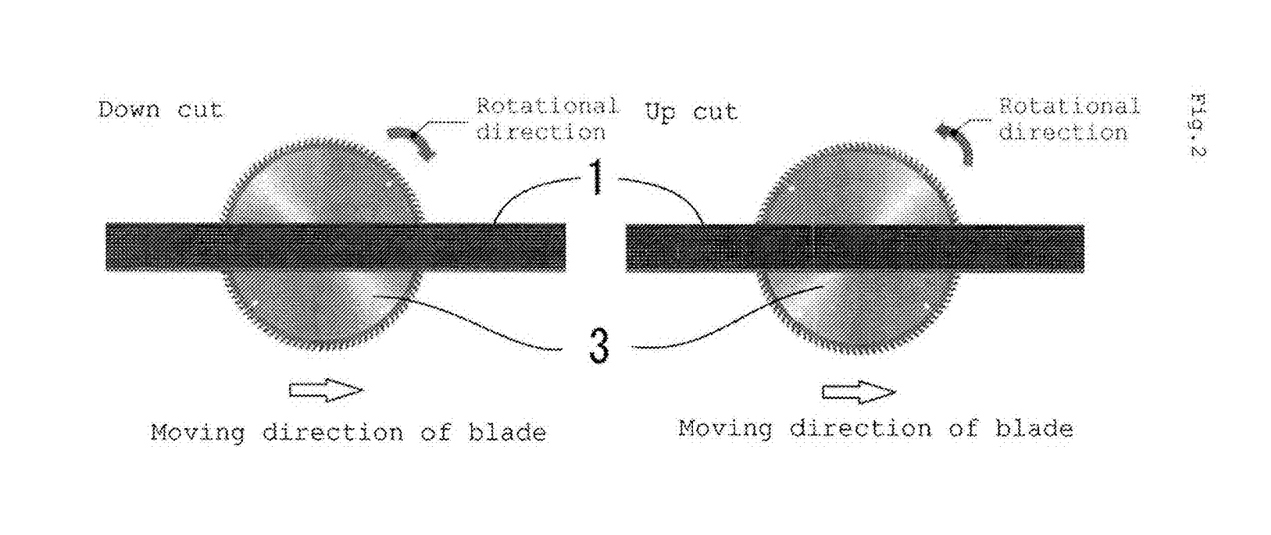
FIG. 2 shows a schematic diagram illustrating an up cut method and a down cut method.

FIG. 2 shows a schematic diagram illustrating an up cut method and a down cut method. The "portion to serve as the exit of the blade of the rotating circular saw" is positioned on the back face side of the to-be-processed portion for the down cut method, and is positioned on the surface side of the to-be-processed portion for the up cut method. In FIG. 2, the moving direction of the circular saw is from the left to the right.

For continuous cutting work, the cutting tool is brought once into contact with the lubricant material for assisting cutting process placed at a portion to serve as the exit of the cutting tool and/or a portion to serve as the entrance of the cutting tool so that the lubricant material for assisting cutting process is attached to the cutting tool (e.g., a circular saw). Therefore, the effects of reducing load to the cutting tool, suppressing the abrasion of the cutting tool, and prolonging the lifespan of the cutting tool can be obtained in subsequent processing.

Examples of the method for closely bringing the lubricant material for assisting cutting process into contact with the workpiece material include, but are not particularly limited to: a method which involves physically fixing the lubricant material for assisting cutting process and the workpiece material with a clip or a jig; and a method using the lubricant material for assisting cutting process having a formed layer of a compound having adhesiveness (adhesive layer) on the surface of the lubricant material for assisting cutting process or the surface of metal foil to be brought into contact with the workpiece material. Among them, the method using the lubricant material for assisting cutting process having a formed adhesive layer is preferred because this method eliminates the need of fixation with a jig or the like. In the present specification, the adhesive layer is defined as a layer of a compound having adhesiveness that is used for fixing the workpiece material and the lubricant material for assisting cutting process.

Cutting Work Step

The cutting work step is the step of forming a through-groove by cutting a workpiece material with a cutting tool while bringing a lubricant material for assisting cutting process into contact with the cutting tool and/or the to-be-processed portion of the workpiece material. Use of the lubricant material for assisting cutting process in this way, for example, for cutting work, particularly, continuous cutting work, enhances the lubricity between the cutting tool surface and the inside wall surface of a cut portion, facilitates eliminating scraps cut by the blade of the cutting tool, and decreases the frequency and degree of rubbing between the blade of the cutting tool and the inside wall surface of a cut portion. Therefore, the abrasion of the blade of the cutting tool is probably reduced. This principle of action applies to every general cutting tool.

In a preferred embodiment, the cutting work step involves cutting the workpiece material with the cutting tool while bringing a lubricant material for assisting cutting process into contact with the cutting tool. Examples of such an embodiment include: an embodiment in which the lubricant material for assisting cutting process-attached cutting tool is used in the contact step mentioned above; an embodiment in which the lubricant material for assisting cutting process is brought into contact with and attached to the cutting tool in the cutting work step; and an embodiment in which in the close contact step mentioned above, the cutting tool brought into contact with the lubricant material for assisting cutting process closely brought into contact with the workpiece material is used so that the lubricant material for assisting cutting process is indirectly brought into contact with the cutting tool. The cutting work is performed while the lubricant material for assisting cutting process is brought into contact with the cutting tool, to thereby constantly supply the lubricant material for assisting cutting process to the cutting tool. Thus, the processing can be performed efficiently. In the case of using the lubricant material for assisting cutting process in close contact with the workpiece material, the lubricant material for assisting cutting process 2 in an amount calculated from the thickness of the lubricant material for assisting cutting process×the blade thickness of a circular saw (area of a portion to be brought into contact with the cutting tool) is supplied to the cutting tool. Use of another lubricant material for assisting cutting process allows a sufficient amount of the lubricant material for assisting cutting process to be supplied to the cutting tool.

In another preferred embodiment, the cutting work step involves cutting the workpiece material with the cutting tool while bringing a lubricant material for assisting cutting process into contact with the to-be-processed portion of the workpiece material. Examples of such an embodiment include: an embodiment in which in the contact step mentioned above, the lubricant material for assisting cutting process-attached cutting tool is used so that the lubricant material for assisting cutting process is indirectly brought into contact with the to-be-processed portion of the workpiece material; and an embodiment in which the close contact step mentioned above is performed.

Two or more of these embodiments of bringing a lubricant material for assisting cutting process into contact with the cutting tool and/or the to-be-processed portion of the workpiece material may be combined. For example, in the cutting work step, the cutting tool may be used in a lubricant material for assisting cutting process-attached state to cut the workpiece material closely brought into contact with another lubricant material for assisting cutting process.

The through-groove obtained by the cutting work is not particularly limited as long as the through-groove is a groove like hole passing through the workpiece material. The width of the through-groove is not particularly limited and is, for example, 0.5 mm or larger, preferably 1.0 mm or larger, more preferably 2.0 mm or larger. The upper limit of the width of the through-groove is not particularly limited and is preferably, for example, 20 mm or smaller. The length of the through-groove is not particularly limited as long as the length is equal to or larger than the width of the groove. The length of the through-groove is, for example, 600 mm or larger, preferably 1000 mm or larger. The upper limit of the length of the through-groove is not particularly limited and is preferably, for example, 5000 mm or smaller. This is because, even if the length of the through-groove is 600 mm or larger, use of the lubricant material for assisting cutting process reduces the abrasion of the cutting tool and further improves the quality of a cut portion (through-groove). The cutting work to obtain the through-groove also includes a process to separate both ends of the groove as a result of extending the length of the through-groove to the end portions of the workpiece material, i.e., parting work.

In the case of using a circular saw, the shape of the through-groove is linear in terms of the characteristics of the tool. The cross sectional shape of the through-groove is not particularly limited, and the cross section is usually rectangular.

The thickness of the workpiece material is not particularly limited and is usually 0.5 mm or larger, preferably 1 mm or larger, more preferably 2 mm or larger. The upper limit of the thickness of the workpiece material is not particularly limited and is preferably, for example, 40 mm or smaller. This is because, even if the thickness of the workpiece material is 0.5 mm or larger, use of the lubricant material for assisting cutting process reduces the abrasion of the cutting tool and further improves the quality of a cut portion (through-groove).

The cutting tool is not particularly limited and is preferably a circular saw or a grind stone generally used in the formation of through-grooves. Both of the circular saw and the grind stone refer to tools which cut a workpiece material while bringing the circumference of a rotating disk shaped blade body into contact with the workpiece material. Among them, the circular saw refers to a tool in which cutting edges are disposed at the periphery of the blade body. The grind stone refers to a tool in which abrasive grains instead of cutting edges are bound to the periphery of the blade body. Both of these tools are used mainly for cutting off the workpiece material. In the present specification, the circular saw and the grind stone are collectively referred to as a "circular saw" unless otherwise specified.

The circular saw is not limited by its diameter of the blade body, blade thickness, material, shape, and presence or absence of a surface coating, and those generally used can be used. The material for the blade body of the circular saw for use in the cutting work of a difficult-to-cut material is preferably high speed steel or PC steel. When cutting edges are disposed at the periphery, a tip saw in which a cemented carbide produced by sintering a powder of a hard metal carbide, diamond, or ceramic is bound to the tips of the cutting edges is more preferably used in the cutting work of a difficult-to-cut material. Examples of the cemented carbide include, but are not particularly limited to, a metal produced by sintering a mixture of tungsten carbide and a binder cobalt. Since such a cemented carbide further improves material characteristics according to a usage purpose, titanium carbide, tantalum carbide, or the like may be further added thereto. Such a cemented carbide, diamond, or ceramic is also used as the abrasive grains of the grind stone. On the other hand, the shape of the blade body of the circular saw can be appropriately selected according to the conditions of cutting work, the type and shape of the workpiece material, etc. Examples of the shape of the blade body of the circular saw include, but are not particularly limited to, the blade thickness of the blade body, diameter, and the number of cutting edges.

In the cutting work step, a general cutting work technique can be used. Examples thereof include cutting work that is performed while cooling a cutting work site and/or the cutting tool using a gas or a liquid. Examples of the method for cooling a cutting work site and/or the cutting tool using a gas include: a method which involves supplying a compressed gas to the cutting work site and/or the cutting tool; and a method which involves supplying an ambient gas to the cutting work site and/or the cutting tool by aspirating the gas in the neighborhood of the cutting work site and/or the cutting tool.

Lubricant Material for Assisting Cutting Process

Examples of the lubricant material for assisting cutting process used in the cutting work method of the present embodiment include, but are not particularly limited to, a lubricant material for assisting cutting process comprising a polymer material and an inorganic filler. Specifically, the lubricant material for assisting cutting process is preferably a lubricant material for assisting cutting process containing a polymer material such as a water soluble or non-water soluble thermoplastic resin or thermosetting resin, and an inorganic filler such as graphite, molybdenum disulfide, tungsten disulfide, or a molybdenum compound. More specifically, the lubricant material for assisting cutting process is more preferably a lubricant material for assisting cutting process containing a high molecular weight compound (A) having a weight average molecular weight of $5\times10^4$ or higher and $1\times10^6$ or lower, a medium molecular weight compound (B) having a weight average molecular weight of $1\times10^3$ or higher and lower than $5\times10^4$, and a carbon (C) having an average particle size of 100 μm or larger. Use of such a lubricant material for assisting cutting process can further reduce load to the cutting tool and tends to be able to further reduce the occurrence of burrs, chippings, or delamination at the end portion of the plane of section.

The shape of the lubricant material for assisting cutting process is not particularly limited as long as the shape allows the workpiece material to be cut with the cutting tool while the lubricant material for assisting cutting process is brought into contact with the cutting tool and/or the to-be-processed portion of the workpiece material. Examples thereof include a lubricant material for assisting cutting process in the form of a sheet, a lubricant material for assisting cutting process in the form of a block such as a round bar shape or a square bar shape, and a lubricant material for assisting cutting process in a melted state. Among them, the form of a sheet is preferred.

The lubricant material for assisting cutting process may be a monolayer comprising a polymer material and an inorganic filler, or may be a multilayer having a layer comprising a polymer material and an inorganic filler, and an additional layer. The additional layer include such as an adhesive layer for improving the adhesion between the lubricant material for assisting cutting process and the workpiece material, and a protective layer for preventing scratches on the surface of the lubricant material for assisting cutting process. Hereinafter, the configuration of the lubricant material for assisting cutting process will be described.

High Molecular Weight Compound (A)

The high molecular weight compound (A) can function as a lubricant agent and is capable of exerting the effects of improving the lubricity of the lubricant material for assisting cutting process and reducing the occurrence of chippings, burrs, or delamination at the end portion of the plane of section. The high molecular weight compound (A) can further function as a molding agent and is capable of exerting the effects of improving the moldability of the lubricant material for assisting cutting process and forming a monolayer (a layer (sheet) can be formed in itself without the use of a support base material). The high molecular weight compound (A) is not particularly limited as long as its weight average molecular weight is $5\times10^4$ or higher and $1\times10^6$ or lower. Examples thereof include water soluble or non-water soluble thermoplastic resins and thermosetting resins. Among them, a water soluble thermoplastic resin and/or a non-water soluble thermoplastic resin, is preferred, and a water soluble thermoplastic resin is more preferred. Examples of the water soluble and the non-water soluble thermoplastic resin include, but are not particularly limited to, water soluble resins and non-water soluble resins described below. The "water soluble resin" refers to a high molecular compound that is dissolved in an amount of 1 g or larger based on 100 g of water at 25° C. at 1 atm. One high molecular weight compound (A) may be used alone, or two or more thereof may be used in combination.

Use of the water soluble resin tends to improve scrap eliminating properties at the time of cutting work by the lubricity of the water soluble resin. Also, use of the water soluble resin moderately softens the surface hardness of the lubricant material for assisting cutting process and therefore tends to be able to further reduce load to the cutting tool. Furthermore, a resin component attached to the cutting work site can be easily removed after the cutting work. Examples of the water soluble thermoplastic resin include, but are not particularly limited to: polyalkylene oxide compounds such as polyethylene oxide, polypropylene oxide, and polyethylene oxide-propylene oxide copolymers; polyalkylene glycol such as polyethylene glycol and polypropylene glycol; ester compounds of polyalkylene glycol; ether compounds of polyalkylene glycol; monostearate compounds of polyalkylene glycol, such as polyethylene glycol monostearate, polypropylene glycol monostearate, and polyglycerin monostearate; water soluble urethanes; water soluble polyether resins; water soluble polyesters; sodium poly(meth)acrylate; polyacrylamide; polyvinylpyrrolidone; polyvinyl alcohol; saccharides such as cellulose and derivatives thereof; and modified polyamide. Among them, polyethylene oxide, polyethylene glycol, and a water soluble polyether resin are preferred from the viewpoint described above.

Use of the non-water soluble resin tends to increase the surface hardness of the lubricant material for assisting cutting process as compared with use of the water soluble resin. This improves the biting performance of the cutting tool at the time of cutting work, can form a cut portion at a position as designed, further improves the rigidity of the lubricant material for assisting cutting process, and improves handleability. Examples of the non-water soluble thermoplastic resin include, but are not particularly limited to: urethane-based polymers; acrylic-based polymers; vinyl acetate-based polymers; vinyl chloride-based polymers; polyester-based polymers; polystyrene-based resins exemplified by polyethylene wax, styrene homopolymers (GPPS), styrene-butadiene copolymers (HIPS), and styrene-(meth)acrylic acid copolymers (e.g., MS resin); and copolymers thereof, or the like.

The weight average molecular weight of the high molecular weight compound (A) is preferably $5\times10^4$ or higher, more preferably $6\times10^4$ or higher, further preferably $1\times10^5$ or higher, still further preferably $1.25\times10^5$ or higher. Also, the weight average molecular weight of the high molecular weight compound (A) is preferably $1\times10^6$ or lower, more preferably $8\times10^5$ or lower, further preferably $7\times10^5$ or lower, still further preferably $6\times10^5$ or lower. When the weight average molecular weight of the high molecular weight compound (A) is $5\times10^4$ or higher, the moldability is further improved. When the weight average molecular weight of the high molecular weight compound (A) is $1\times10^6$ or lower, the lubricity is further improved. In the case of using two or more high molecular weight compounds (A), it is preferred that the respective weight average molecular weights of the compounds should satisfy the range of the weight average molecular weight described above. In the present embodiment, the weight average molecular weight can be measured by a method described in Examples (the same holds true for the description below).

The high molecular weight compound (A) may comprise a high molecular weight compound (A-1) having a weight average molecular weight of $3\times10^5$ or higher and $1\times10^6$ or lower and/or a high molecular weight compound (A-2) having a weight average molecular weight of $5\times10^4$ or higher and lower than $3\times10^5$, and preferably comprises both of the high molecular weight compound (A-1) and the high molecular weight compound (A-2). Combined use of the high molecular weight compound (A-1) and the high molecular weight compound (A-2) tends to further improve the moldability and the lubricity.

The weight average molecular weight of the high molecular weight compound (A-1) is preferably $3\times10^5$ or higher, more preferably $4\times10^5$ or higher, further preferably $4.5\times10^5$ or higher, still further preferably $5\times10^5$ or higher. Also, the weight average molecular weight of the high molecular weight compound (A-1) is preferably $1\times10^6$ or lower, more preferably $8\times10^5$ or lower, further preferably $7\times10^5$ or lower, still further preferably $6\times10^5$ or lower.

The content of the high molecular weight compound (A-1) in the lubricant material for assisting cutting process is preferably 5 parts by mass or larger, more preferably 10 parts by mass or larger, further preferably 15 parts by mass or larger, based on 100 parts by mass in total of the high molecular weight compound (A), the medium molecular weight compound (B), and the carbon (C). Also, the content of the high molecular weight compound (A-1) in the lubricant material for assisting cutting process is preferably 35 parts by mass or smaller, more preferably 30 parts by mass or smaller, further preferably 25 parts by mass or smaller, based on 100 parts by mass in total of the high molecular weight compound (A), the medium molecular weight compound (B), and the carbon (C). When the content of the high molecular weight compound (A-1) is 5 parts by mass or larger, the moldability tends to be further improved. When the content of the high molecular weight compound (A-1) is 35 parts by mass or smaller, the lubricity tends to be further improved.

The weight average molecular weight of the high molecular weight compound (A-2) is preferably $5\times10^4$ or higher, more preferably $6\times10^4$ or higher, further preferably $1\times10^5$ or higher, still further preferably $1.25\times10^5$ or higher. Also, the weight average molecular weight of the high molecular weight compound (A-2) is preferably lower than $3\times10^5$, more preferably $2.5\times10^5$ or lower, further preferably $2\times10^5$ or lower.

The content of the high molecular weight compound (A-2) in the lubricant material for assisting cutting process is preferably 5 parts by mass or larger, more preferably 10 parts by mass or larger, further preferably 15 parts by mass or larger, based on 100 parts by mass in total of the high molecular weight compound (A), the medium molecular weight compound (B), and the carbon (C). Also, the content of the high molecular weight compound (A-2) in the lubricant material for assisting cutting process is preferably 35 parts by mass or smaller, more preferably 30 parts by mass or smaller, further preferably 25 parts by mass or smaller, based on 100 parts by mass in total of the high molecular weight compound (A), the medium molecular weight compound (B), and the carbon (C). When the content of the high molecular weight compound (A-2) is 5 parts by mass or larger, the lubricity tends to be further improved. When the content of the high molecular weight compound (A-2) is 35 parts by mass or smaller, the moldability tends to be further improved.

The content of the high molecular weight compound (A) in the lubricant material for assisting cutting process is preferably 10 parts by mass or larger, more preferably 20 parts by mass or larger, further preferably 25 parts by mass or larger, particularly preferably 30 parts by mass or larger, based on 100 parts by mass in total of the high molecular weight compound (A), the medium molecular weight compound (B), and the carbon (C). Also, the content of the high molecular weight compound (A) in the lubricant material for assisting cutting process is preferably 60 parts by mass or smaller, more preferably 55 parts by mass or smaller, further preferably 50 parts by mass or smaller, based on 100 parts by mass in total of the high molecular weight compound (A), the medium molecular weight compound (B), and the carbon (C). When the content of the high molecular weight compound (A) is 10 parts by mass or larger, the lubricity tends to be further improved. When the content of the high molecular weight compound (A) is 60 parts by mass or smaller, the moldability tends to be further improved. When the content of the high molecular weight compound (A) falls within the range described above, there is a tendency to further reduce load to the cutting tool and further reduce the occurrence of burrs, chippings, or delamination at the end portion of the plane of section. Particularly, when the content of the high molecular weight compound (A) is 20 parts by mass or larger, there is a tendency to further reduce the occurrence of burrs, chippings, or delamination at the end portion of the plane of section.

Medium Molecular Weight Compound (B)

The medium molecular weight compound (B) can function as a lubricant agent and is capable of exerting the effects of improving the lubricity of the lubricant material for assisting cutting process and reducing the occurrence of chippings, burrs, or delamination at the end portion of the plane of section. The medium molecular weight compound (B) is not particularly limited as long as its weight average molecular weight is $1\times10^3$ or higher and lower than $5\times10^4$. Examples thereof include water soluble or non-water soluble thermoplastic resins and thermosetting resins. Among them, a water soluble or non-water soluble thermoplastic resin is preferred, and a water soluble thermoplastic resin is more preferred.

For example, a resin that is a resin of the same type as in the water soluble resin or the non-water soluble resin described above and has a weight average molecular weight within the range described above can be used as the water soluble or the non-water soluble thermoplastic resin. Other examples of the medium molecular weight compound (B) include, but are not particularly limited to: polyalkylene glycol compounds such as polyethylene glycol, polypropylene glycol, and polytetramethylene glycol; monoether compounds of polyalkylene oxide, such as polyethylene oxide oleyl ether, polyethylene oxide cetyl ether, polyethylene oxide stearyl ether, polyethylene oxide lauryl ether, polyethylene oxide nonyl phenyl ether, and polyethylene oxide octyl phenyl ether; monostearate compounds of polyalkylene oxide, such as polyethylene oxide monostearate, polyethylene oxide sorbitan monostearate, and polyglycerin monostearate; and polyalkylene oxide compounds such as polyethylene oxide, polypropylene oxide, and polyethylene oxide-propylene oxide copolymers. Among them, polyethylene oxide monostearate is preferred. Use of such a medium molecular weight compound (B) tends to further improve the lubricity. One medium molecular weight compound (B) may be used alone, or two or more thereof may be used in combination.

The high molecular weight compound (A) and the medium molecular weight compound (B), which differ in molecular weight, may also differ in their respective melt viscosities and melting points. By combined use of such a high molecular weight compound (A) and a medium molecular weight compound (B), although use of the high molecular weight compound (A) alone, for example, reduces the moldability or lubricity of the lubricant material for assisting cutting process due to too high a viscosity or too high a melting point of the lubricant material for assisting cutting process, this can be suppressed. In addition, although use of the medium molecular weight compound (B) alone reduces the moldability or lubricity of the lubricant material for assisting cutting process due to too low a viscosity or too low a melting point of the lubricant material for assisting cutting process, this can be suppressed. As a result, there is a tendency to further reduce load to the cutting tool and further reduce the occurrence of burrs, chippings, or delamination at the end portion of the plane of section.

The weight average molecular weight of the medium molecular weight compound (B) is preferably $1\times10^3$ or higher, more preferably $1.25\times10^3$ or higher, further preferably $1.5\times10^3$ or higher, still further preferably $2\times10^3$ or higher, still further preferably $2.5\times10^3$ or higher, particularly preferably $3\times10^3$ or higher. Also, the weight average molecular weight of the medium molecular weight compound (B) is preferably lower than $5\times10^4$, more preferably $2.5\times10^4$ or lower, further preferably $2\times10^4$ or lower, still further preferably $1\times10^4$ or lower, still further preferably $7.5\times10^3$ or lower, particularly preferably $5\times10^3$ or lower. When the weight average molecular weight of the medium molecular weight compound (B) is $1\times10^3$ or higher, the moldability is further improved. When the weight average molecular weight of the medium molecular weight compound (B) is lower than $5\times10^4$, the lubricity is further improved.

The content of the medium molecular weight compound (B) in the lubricant material for assisting cutting process is preferably 10 parts by mass or larger, more preferably 20 parts by mass or larger, further preferably 30 parts by mass or larger, based on 100 parts by mass in total of the high molecular weight compound (A), the medium molecular weight compound (B), and the carbon (C). Also, the content of the medium molecular weight compound (B) in the lubricant material for assisting cutting process is preferably 75 parts by mass or smaller, more preferably 60 parts by mass or smaller, further preferably 45 parts by mass or smaller, still further preferably 40 parts by mass or smaller, based on 100 parts by mass in total of the high molecular weight compound (A), the medium molecular weight compound (B), and the carbon (C). When the content of the medium molecular weight compound (B) is 10 parts by mass or larger, the lubricity tends to be further improved. When the content of the medium molecular weight compound (B) is 75 parts by mass or smaller, the moldability tends to be further improved. When the content of the medium molecular weight compound (B) falls within the range described above, there is a tendency to further reduce load to the cutting tool and further reduce the occurrence of burrs, chippings, or delamination at the end portion of the plane of section.

Carbon (C)

The carbon (C) can function as a solid lubricant agent and is capable of exerting the effects of improving the lubricity of the lubricant material for assisting cutting process and prolonging the lifespan of the cutting tool in processing. Furthermore, the carbon (C) exists in a solid state having a volume at a temperature of cutting work and therefore, can maintain the lubricity at the time of cutting work. Examples of the carbon (C) include, but are not particularly limited to, natural graphite, artificial graphite, active carbon, acetylene black, carbon black, colloidal graphite, pyrolytic graphite, expanded graphite, and flake graphite. Among others, a flake shape is preferred. The carbon (C) having flake graphite tends to further improve the abrasion reducing performance. One carbon (C) may be used alone, or two or more thereof may be used in combination.

In cutting work, particularly, continuous cutting work, using the lubricant material for assisting cutting process, the carbon (C) is attached to the surface or groove of the cutting tool and the inside side face of a cut portion in the workpiece material to thereby exhibit lubricity. In this case, the carbon (C) less varies in volume and hardness due to change in temperature, as compared with the high molecular weight compound (A) and the medium molecular weight compound (B), and can therefore keep constant volume and hardness in cutting work even if the temperature of the cutting tool or a processing site is elevated. Specifically, the carbon (C) can reside normally, for example, between the cutting tool and the workpiece material in cutting work to thereby enhance lubricity and exhibit effects similar to those of bearings. Therefore, the carbon (C) is effective for suppressing the abrasion of the cutting tool. The carbon (C) has moderately high hardness, as compared with other solid lubricant agents, and is therefore excellent in the bearing effects described above and excellent in lubricity. As a result, there is a tendency to further reduce load to the cutting tool and further reduce the occurrence of burrs, chippings, or delamination at the end portion of the plane of section.

The average particle size of the carbon (C) is preferably 50 μm or larger, more preferably 100 μm or larger, further preferably 150 μm or larger, particularly preferably 200 μm or larger. Also, the average particle size of the carbon (C) is preferably 1000 μm or smaller, more preferably 750 μm or smaller, further preferably 500 μm or smaller, particularly preferably 300 μm or smaller. When the average particle size of the carbon (C) is 50 μm or larger, the lubricity and the moldability are further improved. As a result, there is a tendency to further reduce load to the cutting tool, prolong the lifespan of the cutting tool, and further reduce the occurrence of burrs, chippings, or delamination at the end portion of the plane of section. When the average particle size of the carbon (C) is 100 μm or larger, the lubricity and the moldability are further improved. As a result, there is a tendency to further prolong the lifespan of the cutting tool such as a circular saw and further reduce the occurrence of burrs, chippings, or delamination at the end portion of the plane of section. When the average particle size of the carbon (C) is 1000 μm or smaller, there is a tendency to further suppress the abrasion of the cutting tool. In the case of comprising two or more carbons (C), it is preferred that the respective average particle sizes of the carbons (C) should satisfy the range described above.

In the specification of the present application, the average particle size of the carbon (C) refers to a median size. The median size means a particle diameter that is obtained from the cumulative distribution curve (number based) of particle sizes and becomes 50% height in the curve (D50 value), and can be measured by a method described in Examples.

The content of the carbon (C) in the lubricant material for assisting cutting process is preferably 5 parts by mass or larger, more preferably 15 parts by mass or larger, further preferably 20 parts by mass or larger, still further preferably 25 parts by mass or larger, particularly preferably 30 parts by mass or larger, based on 100 parts by mass in total of the high molecular weight compound (A), the medium molecular weight compound (B), and the carbon (C). Also, the content of the carbon (C) in the lubricant material for assisting cutting process is preferably 70 parts by mass or smaller, more preferably 65 parts by mass or smaller, further preferably 60 parts by mass or smaller, based on 100 parts by mass in total of the high molecular weight compound (A), the medium molecular weight compound (B), and the carbon (C). When the content of the carbon (C) is 5 parts by mass or larger, the lubricity tends to be further improved. When the content of the carbon (C) is 70 parts by mass or smaller, the moldability tends to be further improved. When the content of the carbon (C) falls within the range described above, there is a tendency to further reduce load to the cutting tool and further reduce the occurrence of burrs, chippings, or delamination at the end portion of the plane of section.

Additional Component

The lubricant material for assisting cutting process may optionally contain an additional component. The additional component include lubricity improving components, formability improving components, plasticizers, softening agents, surface conditioners, leveling agents, antistatic agents, emulsifiers, antifoaming agents, wax additives, coupling agents, rheology controlling agents, antiseptics, antifungal agents, antioxidants, light stabilizers, nucleating agents, organic fillers, inorganic fillers, solid lubricant agents, heat stabilizers, and colorants.

Examples of the lubricity improving components include, but are not particularly limited to: amide compounds exemplified by ethylenebisstearamide, oleic acid amide, stearic acid amide, and methylenebisstearamide; fatty acid compounds exemplified by lauric acid, stearic acid, palmitic acid, and oleic acid; fatty acid ester compounds typified by butyl stearate, butyl oleate, and glycol laurate; aliphatic hydrocarbon compounds typified by liquid paraffin; and higher aliphatic alcohols typified by oleyl alcohol. At least one of these lubricity improving components can be selected.

Examples of the formability improving components include, but are not particularly limited to, epoxy resins, phenol resins, cyanate resins, melamine resins, urea resins, and thermosetting polyimide, which are thermosetting resins. At least one of these formability improving components can be selected.

When the lubricant material for assisting cutting process is placed on the curved surface of a workpiece material (e.g., CFRP), a plasticizer or a softening agent contained in the lubricant material for assisting cutting process can suppress cracks in the lubricant material for assisting cutting process, for example, by mitigating stress or strain to the lubricant material for assisting cutting process, and tends to further improve the curved surface following properties. Examples of the plasticizer or the softening agent include, but are not particularly limited to, phthalic acid ester, adipic acid ester, trimellitic acid ester, polyester, phosphoric acid ester, citric acid ester, epoxidized plant oil, and sebacic acid ester.

Examples of the solid lubricant agents other than the carbon (C) include, but are not particularly limited to, molybdenum disulfide, tungsten disulfide, molybdenum compounds, polytetrafluoroethylene, and polyimide.

Adhesive Layer

The lubricant material for assisting cutting process may have an adhesive layer on a face to be brought into contact with the workpiece material. Having the adhesive layer tends to further improve the adhesion between the lubricant material for assisting cutting process and the workpiece material.

The component constituting the adhesive layer is not particularly limited and is, for example, a thermoplastic resin and/or a thermosetting resin. Examples of the thermoplastic resin include, but are not particularly limited to, urethane-based polymers, acrylic-based polymers, vinyl acetate-based polymers, vinyl chloride-based polymers, polyester-based polymers, and copolymers thereof. Examples of the thermosetting resin include, but are not particularly limited to, resins such as phenol resins, epoxy resins, melamine resins, urea resins, unsaturated polyester resins, alkyd resins, polyurethane, thermosetting polyimide, and cyanate resins. Among them, an acrylic-based polymer is preferred because it is required to have the properties of leaving no paste on the workpiece material (e.g., CFRP) and being capable of easily adhering at ordinary temperature. A solvent type acrylic pressure sensitive adhesive and an acrylic emulsion type pressure sensitive adhesive (aqueous) are more preferred.

The adhesive layer may optionally contain a degradation preventing agent such as an antioxidant, and an inorganic filler such as calcium carbonate, talc, or silica, as components of the adhesive layer.

When the lubricant material for assisting cutting process is removed from the workpiece material after the cutting work, the amount of a component of the lubricant material for assisting cutting process and/or the adhesive layer attached to the workpiece material is preferably $1.0 \times 10^{-8}$ g or smaller, more preferably $5.0 \times 10^{-9}$ g or smaller, per $mm^2$ of the areas of the contact portion between the workpiece material and the lubricant material for assisting cutting process, and the processed portion. The lower limit of the amount of a component of the lubricant material for assisting cutting process and/or the adhesive layer attached to the workpiece material is not particularly limited and is preferably 0. In this context, the processed portion refers to the inside of a groove cut by through-groove formation with, for example, a circular saw.

Thickness

The thickness of the lubricant material for assisting cutting process excluding the adhesive layer is not particularly limited and is appropriately selected according to a cutting method for the cutting work of the workpiece material, a cut off method, the area or volume of a portion subjected to the cutting work, the size of the cutting tool for use in the cutting work, the configuration or thickness of the workpiece material, etc. Among others, the thickness of the lubricant material for assisting cutting process in the form of a sheet is preferably 0.1 mm or larger, more preferably 0.2 mm or larger, further preferably 0.5 mm or larger. Also, the thickness of the lubricant material for assisting cutting process is preferably 20 mm or smaller, more preferably 10 mm or smaller, further preferably 5 mm or smaller. When the thickness of the lubricant material for assisting cutting process is 0.1 mm or larger, sufficient reduction in cutting stress tends to be obtained. When the thickness of the lubricant material for assisting cutting process is 20 mm or smaller, there is a tendency to reduce the twining of the lubricant material for assisting cutting process around the cutting tool in cutting work and be able to further suppress the occurrence of cracks in the lubricant material for assisting cutting process.

The resin contained in the lubricant material for assisting cutting process can be prevented from serving as a binder for cutting chips. There is a tendency to be able to prevent cutting chips from remaining in a cut portion. This tends to be able to suppress increase in the inside irregularity of the cut portion. In short, the lubricity can be improved by securing the proper composition and thickness of the lubricant material for assisting cutting process. The elimination of cutting chips through the groove of the cutting tool can be optimized for cutting work. For further obtaining the effects of the present invention, it is preferred to appropriately control the total thickness of the lubricant material for assisting cutting process within the range mentioned above. A plurality of thin lubricant material for assisting cutting processes may be layered for use.

The thickness of the adhesive layer is not particularly limited and is preferably 0.01 mm or larger, more preferably 0.05 mm or larger. Also, the thickness of the adhesive layer is preferably 5 mm or smaller, more preferably 2.5 mm or smaller.

The thickness of each layer constituting the lubricant material for assisting cutting process is measured as follows. First, the lubricant material for assisting cutting process is cut off in a direction perpendicular to the lubricant material for assisting cutting process using a cross section polisher (CROSS-SECTION POLISHER SM-09010 manufactured by JEOL Ltd. DATUM Solution Business Operations) or an ultramicrotome (EM UC7 manufactured by Leica Camera AG). Next, the plane of section is observed in a direction perpendicular to the plane of section using a scanning electron microscope (SEM) (VE-7800 manufactured by Keyence Corp.) to measure the thickness of each layer constituting the lubricant material for assisting cutting process. In this operation, the thicknesses of 5 sites per field of view are measured, and an average value thereof is used as the thickness of each layer.

Method for Producing Lubricant Material for Assisting Cutting Process

The method for producing the lubricant material for assisting cutting process is not particularly limited, and a conventional method known in the art for molding a resin composition comprising a resin such as a polymer material, and a filler (e.g., an inorganic filler) into a sheet or the form of a block such as a round bar shape or a square bar shape can be widely used. Examples of the method include: a method which involves mixing the high molecular weight compound (A), the medium molecular weight compound (B), and the carbon (C) in the presence or absence of a solvent, applying the mixture to a support, solidifying the mixture by cooling to form a sheet, and then peeling off the support therefrom to obtain the lubricant material for assisting cutting process; and a method which involves mixing the high molecular weight compound (A), the medium molecular weight compound (B), and the carbon (C) in the presence or absence of a solvent, extrusion molding the mixture into a sheet shape, and drawing the sheet, if necessary, to obtain the lubricant material for assisting cutting process.

When the lubricant material for assisting cutting process is the multilayer mentioned above (e.g., an lubricant sheet for assisting cutting process, having an adhesive layer and/or a protective layer), examples of the method for producing the multilayer include, but are not particularly limited to: a method which involves preparing one layer in advance and directly forming another layer on at least one side thereof; and a method which involves laminating one layer prepared in advance and another layer by a lamination method using an adhesive resin or heat.

The method for forming an adhesive layer on the surface of the lubricant material for assisting cutting process is not particularly limited as long as the method is known in the art and industrially used. Specific examples thereof include: a method which involves forming the adhesive layer by a roll method, a curtain coating method, a spraying method, or the like; and a method which involves forming in advance the adhesive layer having the desired thickness using a roll, a T-die extruder, or the like. The thickness of the adhesive layer is not particularly limited, and the optimum thickness can be appropriately selected according to the curvature of the workpiece material and the configuration of the lubricant material for assisting cutting process.

In the case of producing the lubricant material for assisting cutting process in a melted state, examples of the method therefor include: a method using, as the lubricant material for assisting cutting process, a resin composition obtained by mixing a resin and a filler; and a method using, as the lubricant material for assisting cutting process, a resin composition obtained by mixing a resin, a filler, and a solvent.

Workpiece Material

The workpiece material is not particularly limited as long as the workpiece material comprises one or more materials selected from the group consisting of a metal, a fiber reinforced plastic, ceramic, and a composite material thereof.

Examples of the metal include, but are not particularly limited to, iron, aluminum, and titanium as well as alloys such as stainless steel (SUS), duralumin, carbon steel, and tool steel. Among them, stainless steel is preferred.

The fiber reinforced plastic is not particularly limited as long as the composite material is made of a matrix resin and a reinforcing fiber. Examples of the matrix resin include, but are not particularly limited to: thermosetting resins such as epoxy resins, phenol resins, cyanate resins, vinyl ester resins, and unsaturated polyester resins; and thermoplastic resins such as ABS (acrylonitrile-butadiene-styrene) resins, PA (polyamide) resins, PP (polypropylene) resins, PC (polycarbonate) resins, methyl methacrylate resins, polyethylene, and acryl, and polyester resins. Examples of the reinforcing fiber include, but are not particularly limited to, glass fiber, carbon fiber, and aramid fiber. Examples of the form of the reinforcing fiber include, but are not particularly limited to, filaments, tows, cloths, blades, chops, milled fibers, felt mats, papers, and prepregs. Specific examples of such a fiber reinforced plastic include, but are not particularly limited to, fiber reinforced plastics (FRP) such as carbon fiber reinforced plastics (CFRP), glass fiber reinforced plastics (GFRP), and aramid fiber reinforced plastics (AFRP). Among them, a carbon fiber reinforced plastic (CFRP) relatively having large tensile strength and tensile elastic force and small density is preferred. The fiber reinforced plastic may optionally contain an additional component such as an inorganic filler or an organic filler. The fiber reinforced plastics (FRP) conceptually comprise a reinforcing fiber and a thermosetting resin and/or a thermoplastic resin. Among others, fiber reinforced plastics comprising a reinforcing fiber and a thermoplastic resin are also referred to as FRTP (fiber reinforced thermoplastics). For example, fiber reinforced plastics comprising carbon fiber and a thermoplastic resin as a matrix resin are referred to as CFRTP (carbon fiber reinforced thermoplastics). Among them, a fiber reinforced plastic (CFRTP) is more preferred as the workpiece material.

Examples of the ceramic include, but are not particularly limited to, hard oxides such as alumina, quartz, and zirconia as well as carbides such as silicon carbide, and nitrides such as silicon nitride and gallium nitride. Examples of the form of the ceramic include, but are not particularly limited to, monocrystals, polycrystals, and sintered powders.

The cutting work method of the present embodiment is particularly useful for the processing of CFRTP having relatively poor heat resistance to form through-grooves, because the lubricant material for assisting cutting process can reduce the generation of the heat of friction at the time of cutting. The reduction in the heat of friction can suppress the melting of an impregnated resin. In addition, this can also reduce the occurrence of burrs or delamination.

When the workpiece material is a fiber reinforced plastic densely containing fiber, the amount of the fiber cut is large. This tends to facilitate the abrasion of the blade of a cutting tool. Use of the lubricant material for assisting cutting process can reduce the abrasion of the blade of a cutting tool. In the case of processing a fiber reinforced plastic with a more worn cutting tool, the cutting tool cuts the fiber reinforced plastic by pressing and cutting the fiber. Therefore, delamination occurs easily between layers of prepregs. As a result, there is the disadvantage that delamination occurs more easily at the exit portion of cutting tool penetration. However, use of the lubricant material for assisting cutting process can further suppress burrs, chippings, or delamination.

When the fiber reinforced plastic is a UD material, the entry of the blade of a cutting tool at an angle to bite and hollow out a carbon fiber bundle is more likely to cause fiber buckling in the inside wall of a cut portion. In this respect, use of the lubricant material for assisting cutting process suppresses fiber buckling and, furthermore, suppresses even a rise in temperature caused by the heat of friction. Therefore, the glass transition point (temperature) or softening point of the matrix resin becomes difficult to reach. Thus, the firmly bundled state of carbon fiber can be maintained, and fiber buckling can be suppressed. The "UD material" means a fiber reinforced plastic obtained using a cloth material of fibers aligned in only one direction.

Method for Producing Cut Product

The method for producing a cut product according to the present embodiment comprises the cutting work method described above. In the cut product obtained by the production method, the occurrence of burrs or chippings at the end portion of the plane of section is suppressed, and even delamination is suppressed when the workpiece material is a fiber reinforced plastic.

EXAMPLES

Hereinafter, the present invention will be specifically described with reference to Examples and Comparative Examples. Examples described below are given merely for illustrating one example of the embodiment of the present invention. The present invention is not intended to be limited by these examples.

Production of Lubricant Sheet for Assisting Cutting Process 15 parts by mass of polyethylene oxide (Alkox E-45 manufactured by Meisei Chemical Works, Ltd., weight average molecular weight=$5.6 \times 10^5$) and 15 parts by mass of polyethylene oxide (Alkox R-150 manufactured by Meisei Chemical Works, Ltd., weight average molecular weight=$1.5 \times 10^5$) as the high molecular weight compound (A), 35 parts by mass of polyethylene oxide monostearate (Nonion S-40 manufactured by NOF Corp., weight average molecular weight=3.5×10³) as the medium molecular weight compound (B), and 35 parts by mass of graphite (XD-100, Ito Graphite Co., Ltd., average particle size=250 μm, flake shape) as the carbon (C) were molded at a temperature of 140° C. using a single screw extruder to produce a sheet having a thickness of 1.0 mm. The strongly adhesive face of double faced tape having a thickness of 0.12 mm (No. 535A, manufactured by Nitto Denko Corp.) was affixed to one side of this sheet to produce a lubricant sheet for assisting cutting process.

The average particle size (median size) of the carbon (C) was determined that the carbon was dispersed in a solution composed of a hexametaphosphoric acid solution and a few drops of triton, and the respective maximum lengths of projected carbon particles were measured using a laser diffraction particle size distribution analyzer. Then, the cumulative distribution curve (number based) of particle sizes was calculated. A particle diameter that became 50% height in the cumulative distribution curve (number based) was used as the average particle size.

The weight average molecular weights of the high molecular weight compound (A) and the medium molecular weight compound (B) were calculated as relative average molecular weights by dissolving or dispersing each of the high molecular weight compound (A) and the medium molecular weight compound (B) in a 0.05% salt solution, followed by measurement by liquid chromatography involving GPC (gel permeation chromatography) columns with polyethylene glycol as standards.

Example 1

The produced lubricant sheet for assisting cutting process was affixed to one side of a workpiece material CFRTP plate having a size of 100 mm×100 mm and a thickness of 2 mm ("TEPEX dynalite 202-C200(9)/50%, t2.0 mm" manufactured by Bond Laminates GmbH). Subsequently, the CFRTP plate was placed with the affixed side of the lubricant sheet for assisting cutting process facing down, and through-grooves having a width of 0.8 mm were formed by down cut under conditions involving the number of rotations of 3,500 rpm and a workpiece material moving speed of 600 mm/min using a circular saw ("Desktop Circular Sawing Machine K-210" manufactured by Hozan Tool Ind. Co., Ltd.) equipped with a disc cutter having a diameter of 85 mm and a blade thickness of 0.8 mm ("Disc Cutter (K-210-dedicated replacement blade) K-210-3 Diamond" manufactured by Hozan Tool Ind. Co., Ltd.) until burrs occurred at the end portion of the plane of section. As a result, burrs occurred at the end portion of the plane of section of the workpiece material when a total of 22,000 mm through-grooves were formed.

Example 2

The produced lubricant sheets for assisting cutting process were affixed to the surface and the hark face of a workpiece material CFRP plate having a thickness of 10 mm (manufactured by Ibaraki Industry Corp., UD material). Subsequently, the CFRP plate was placed with the affixed side of the lubricant sheet for assisting cutting process facing down, and through-grooves having a width of 1.0 mm were formed by down cut under conditions involving the number of rotations of 3,200 rpm and a workpiece material moving speed of 1,000 mm/min using a circular saw ("Slide Circular Saw LS1213" manufactured by Makita Corp.) equipped with a disc cutter having a diameter of 305 mm and a blade thickness of 1.0 mm until burrs occurred at the end portion of the plane of section. As a result, burrs occurred at the end portion of the plane of section of the workpiece material when a total of 4,000 mm through-grooves were formed.

Comparative Example 1

Cutting work was performed in the same way as in Example 1 except that no lubricant sheet for assisting cutting process was used. As a result, burrs occurred at the end portion of the plane of section of the workpiece material when a total of 10 mm through-grooves were formed. In addition, the cutting work was further continued in the state with the burrs. As a result, the continuation of the cutting work became impossible when a total of 150 mm (140 mm from the occurrence of the burrs) through-grooves were formed.

Comparative Example 2

Cutting work was performed in the same way as in Example 2 except that no lubricant sheet for assisting cutting process was used. As a result, burrs occurred at the end portion of the plane of section of the workpiece material when a total of 1,000 mm through-grooves were formed.

The results described above demonstrated that use of the lubricant sheet for assisting cutting process in the processing of a difficult-to-cut material to form through-grooves can produce a high quality plane of section and significantly suppresses the abrasion of a cutting tool.

The present application is based on Japanese Patent Application No. 2016-028249 filed with the Japan Patent Office on Feb. 17, 2016, the contents of which are incorporated herein by reference.

In the cutting work of a workpiece material, particularly, a difficult-to-cut material, the cutting work method of the present invention improves the processing quality thereof and reduces processing cost, and therefore has industrial applicability.

The invention claimed is:
1. A cutting work method comprising:
   a cutting work step of forming a through-groove passing through from a surface to a back face of a workpiece material by cutting the workpiece material with a cutting tool while bringing a lubricant material for assisting cutting process into contact with the cutting tool and/or a to-be-processed portion of the workpiece material, the cutting tool being a circular saw; and
   a contact step of bringing in advance the lubricant material for assisting cutting process into contact with a portion to serve as the exit of the blade of the circular saw, on the surface or the back face of the workpiece material such that the lubricant material for assisting cutting process covers the portion to serve as the exit, wherein
   the workpiece material comprises one or more materials selected from the group consisting of a metal, a fiber reinforced plastic, ceramic, and a composite material thereof and the lubricant material for assisting cutting process is a lubricant sheet for assisting cutting process.
2. The cutting work method according to claim 1, further comprising:
   a contact step of bringing in advance the lubricant material for assisting cutting process into contact with a portion to serve as a starting point for forming the through-groove, on the side face of the workpiece material.

3. The cutting work method according to claim 1, further comprising:
a contact step of bringing in advance the lubricant material for assisting cutting process into contact with a portion where the through-groove is to be formed, on the surface and/or the back face of the workpiece material such that the lubricant material for assisting cutting process covers the portion.

4. The cutting work method according to claim 1, wherein the lubricant material for assisting cutting process contains:
a high molecular weight compound (A) having a weight average molecular weight of $5\times10^4$ or higher and $1\times10^6$ or lower;
a medium molecular weight compound (B) having a weight average molecular weight of $1\times10^3$ or higher and lower than $5\times10^4$; and
a carbon (C) having an average particle size of 100 μm or larger.

5. The cutting work method according to claim 4, wherein the carbon (C) is flake graphite.

6. The cutting work method according to claim 4, wherein
the high molecular weight compound (A) comprises a thermoplastic resin having a weight average molecular weight of $5\times10^4$ or higher and $1\times10^6$ or lower, and
the medium molecular weight compound (B) comprises a thermoplastic resin having a weight average molecular weight of $1\times10^3$ or higher and $2\times10^4$ or lower.

7. The cutting work method according to claim 4, wherein the high molecular weight compound (A) comprises a water soluble thermoplastic resin and/or a non-water soluble thermoplastic resin, wherein
the water soluble thermoplastic resin is one or more resins selected from the group consisting of a polyalkylene oxide compound, a polyalkylene glycol, an ester compound of the polyalkylene glycol, an ether compound of the polyalkylene glycol, a monostearate compound of the polyalkylene glycol, a water soluble urethane, a water soluble polyether resin, a water soluble polyester, sodium poly(meth)acrylate, polyacrylamide, polyvinylpyrrolidone, polyvinyl alcohol, saccharides, and modified polyamide, and
the non-water soluble thermoplastic resin is one or more resins selected from the group consisting of a urethane-based polymer, an acrylic-based polymer, a vinyl acetate-based polymer, a vinyl chloride-based polymer, a polyester-based polymer, a polystyrene-based resin, and a copolymer thereof.

8. The cutting work method according to claim 4, wherein the medium molecular weight compound (B) is one or more compounds selected from the group consisting of a polyalkylene glycol compound, a monoether compound of polyalkylene oxide, a monostearate compound of polyalkylene oxide, and a polyalkylene oxide compound.

9. The cutting work method according to claim 4, wherein in the lubricant material for assisting cutting process,
a content of the high molecular weight compound (A) is 20 to 60 parts by mass based on 100 parts by mass in total of the high molecular weight compound (A), the medium molecular weight compound (B), and the carbon (C),
a content of the medium molecular weight compound (B) is 10 to 75 parts by mass based on 100 parts by mass in total of the high molecular weight compound (A), the medium molecular weight compound (B), and the carbon (C), and
a content of the carbon (C) is 5 to 70 parts by mass based on 100 parts by mass in total of the high molecular weight compound (A), the medium molecular weight compound (B), and the carbon (C).

10. The cutting work method according to claim 1, wherein
the lubricant sheet for assisting cutting process has a thickness of 0.1 mm or larger and 20 mm or smaller.

11. The cutting work method according to claim 1, wherein
the lubricant material for assisting cutting process has an adhesive layer on a face to be brought into contact with the workpiece material.

12. The cutting work method according to claim 11, wherein
the adhesive layer comprises an acrylic-based polymer.

13. The cutting work method according to claim 1, wherein
the workpiece material is one or more materials selected from the group consisting of stainless steel, a carbon fiber reinforced plastic, and a composite material comprising these materials.

14. The cutting work method according to claim 1, wherein
the workpiece material is a carbon fiber reinforced plastic containing a thermoplastic resin as a matrix resin.

15. A method for producing a cut product, comprising a cutting work method according to claim 1.

* * * * *